United States Patent [19]
Dyer

[11] Patent Number: 5,156,332
[45] Date of Patent: Oct. 20, 1992

[54] PRESSURE REGULATING FLOW CONTROL APPARATUS

[75] Inventor: Gerald P. Dyer, Enfield, Conn.

[73] Assignee: United Technologies Corporation, Hartford, Conn.

[21] Appl. No.: 764,757

[22] Filed: Sep. 24, 1991

[51] Int. Cl.⁵ .......................................... G05D 27/00
[52] U.S. Cl. .................................... 236/87; 137/468; 236/92 R
[58] Field of Search ................ 236/87, 92 R; 137/468

[56] References Cited

U.S. PATENT DOCUMENTS

| | | | |
|---|---|---|---|
| 2,829,492 | 4/1958 | Klanman | 236/92 R X |
| 3,047,055 | 7/1962 | Kimm | 236/92 R X |
| 3,174,410 | 3/1965 | Booth et al. | 236/92 R X |
| 3,474,811 | 10/1969 | Blain | 236/92 R X |
| 3,538,707 | 11/1970 | Karol | 60/39.28 |
| 4,336,903 | 6/1982 | Zirps | 236/92 R |
| 4,440,191 | 3/1984 | Hansen | 137/468 |

*Primary Examiner*—William E. Tapolcai
*Attorney, Agent, or Firm*—William W. Habelt

[57] ABSTRACT

A pressure regulating flow control apparatus comprises a flow metering valve (10) for controllably discharging a fluid from a spring-biased throttling spool (30) thereof to a fluidic device at a regulated pressure and a pressure modulting valve (100) operatively associated with the throttling spool (30) of the flow metering valve (10) for modulating the fluid pressue in subchamber (18) of the metering valve (10) to alter the position of the throttling spool to adjust the regulated pressure in response to fluid temperature over a relatively large temperature range so as to compensate for the variation of fluid viscosity with fluid temperature.

6 Claims, 2 Drawing Sheets

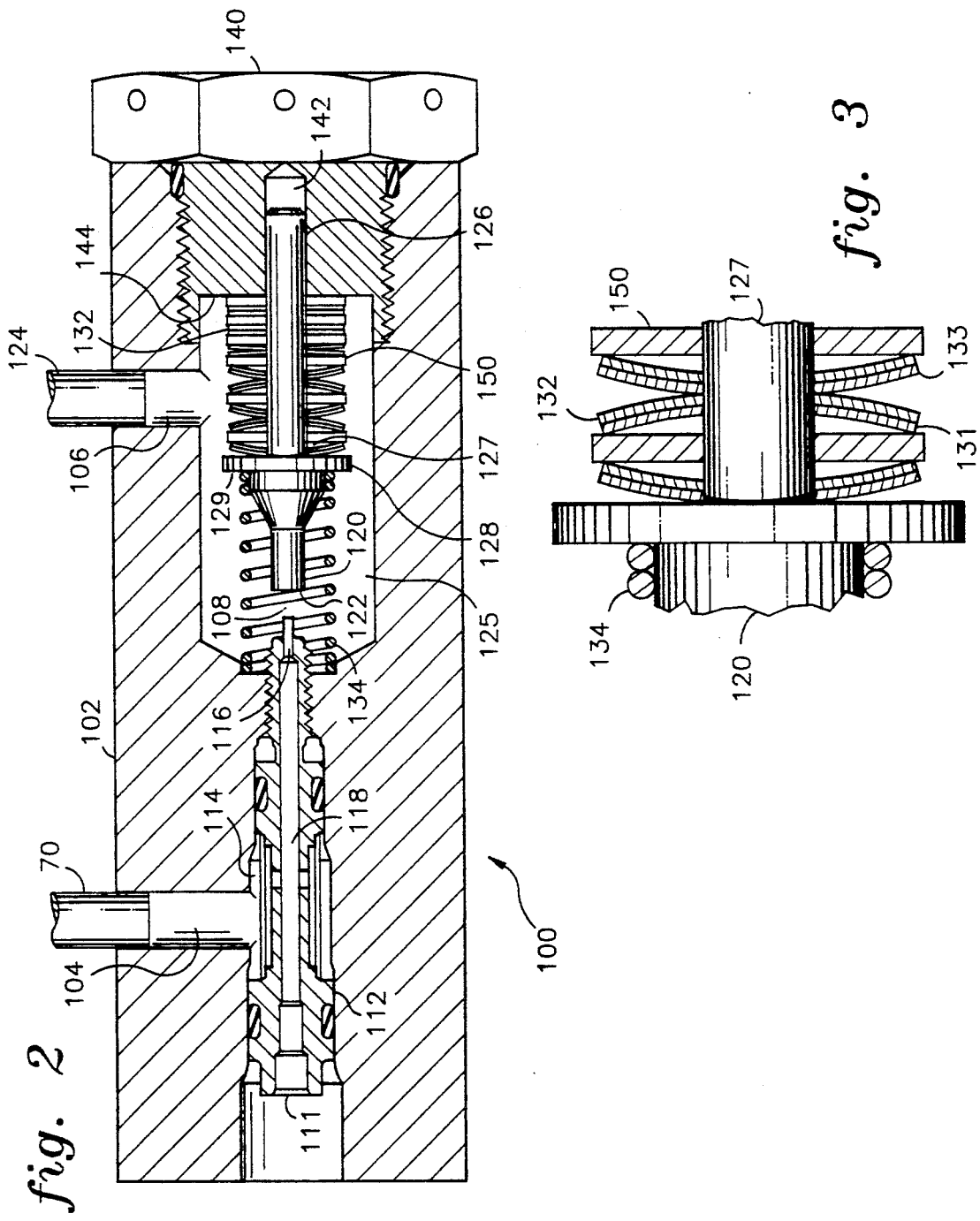

PRESSURE REGULATING FLOW CONTROL APPARATUS

TECHNICAL FIELD

This invention relates generally to flow control devices and, more particularly, to pressure regulating flow control devices for controllably metering over a wide temperature range the flow of a fluid whose density changes with temperature and delivering the metered fluid at a regulated pressure which varies greatly with fluid temperature.

BACKGROUND ART

In certain industrial applications, such as for example hydromechanical fuel controls, hydraulic servovalves and other fluidicly actuated devices, it is necessary to deliver fluid to the device, be it fuel, hydraulic fluid or actuation fluid, at a controlled rate and at a regulated pressure. The mass flow rate of a constant density fluid through a conduit is a function of the flow area thereof and the pressure drop therethrough. Thus, conventional flow control valves suitable for metering fluid flow and regulating fluid pressure generally incorporate both a flow throttling element and a pressure regulating element, which are independently adjustable. Typically, the pressure regulating valve operates to maintain a constant pressure drop across the throttling element, thereby permitting the rate of flow through the valve to be controlled by varying the flow area by adjustment of the throttling element. The pressure at which the fluid is delivered from the valve is less than the pressure of the fluid supplied to the valve by an amount equal to the pressure drop across the throttling element, which is maintained at a constant by the pressure regulating element. While satisfactory for use with constant density fluids, such flow control devices can not maintain a constant pressure drop if the temperature, and consequently density, of the fluid varies substantially over the operational range of the device.

A flow control device which is capable of maintaining a constant drop in response to varying fluid temperature, and therefore varying fluid density, is described in commonly assigned U.S. Pat. No. 4,440,191 to Hansen. As disclosed therein, the flow device comprises an axially positionable flow throttling element disposed within the valve cavity and a pressure regulating element which is coaxially received within the throttling element and is independently axially translatable with respect thereto. The flow throttling element is selectively positionable by application of a servofluid to vary the flow area through the device. The pressure regulating element is spring biased against supply pressure and independently positionable relative to the throttling element by applying regulated pressure, i.e. supply pressure reduced by the pressure drop, thereto in opposition to the supply pressure. Concave-convex bimetallic discs are disposed so as to vary the spring bias force upon the pressure regulating element in response to changes in the fluid temperature. While functional to vary the pressure drop by a few psi in response to small changes in fluid temperature, such a flow control valve can not function to give large changes in pressure drop, such as 50 to 200 psi, in response to greater fluid temperature variations on the order of 20 to 100 degrees Fahrenheit.

DISCLOSURE OF INVENTION

It is an object of the present invention to provide a flow control apparatus wherein the pressure drop across the metering element thereof is varied in response to fluid temperature.

It is also an object of the present invention to provide such a flow control apparatus wherein the pressure drop across the metering element thereof is varied in response to fluid temperature so as to compensate for corresponding variations in fluid viscosity.

In accordance with the present invention, a pressure regulating flow control apparatus comprises a flow metering valve for controllably discharging a fluid from a throttling spool thereof to a fluidic device at a regulated pressure and a pressure modulating valve operatively associated with the throttling spool of the flow metering valve for modulating the position of the throttling spool wherein the regulated pressure is modulated in response to fluid temperature over a relatively large temperature range so as to compensate for variation of fluid viscosity with fluid temperature.

BRIEF DESCRIPTION OF DRAWING

These and other objects, features and advantages of the present invention will become more apparent in light of the detailed description of a best mode embodiment thereof, as illustrated in the accompanying drawing, wherein:

FIG. 2 is a side elevational view, partly sectioned, of the pressure modulating valve of the flow control apparatus depicted in FIG. 1; and FIG. 3 is an enlarged side elevational view, partly sectioned, of an embodiment of the temperature sensitive positioning means of the pressure modulating valve of FIG. 2.

BEST MODE FOR CARRYING OUT THE INVENTION

Figure 1:
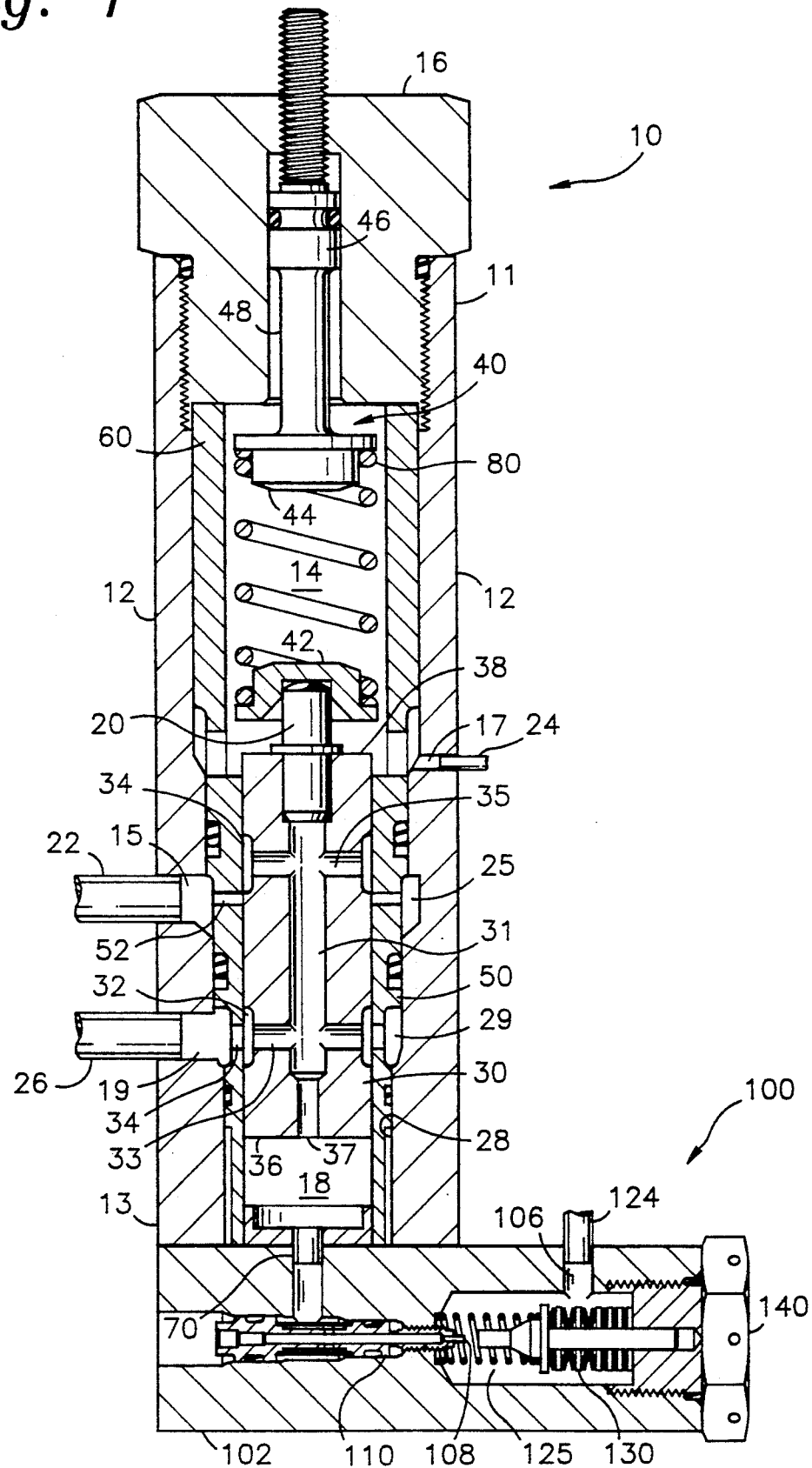
FIG. 1 is a side elevational view, partly sectioned, of an embodiment of the flow control apparatus of the present invention.

Referring now to FIG. 1, the flow control apparatus of the present invention comprises a flow metering valve 10 and a pressure modulating valve 100 operatively associated therewith. The metering valve 10 comprises a housing 12 defining a valve chamber 14, an axially translatable throttling spool 30 disposed within the valve chamber 14, and a preload spring assembly 40 disposed within the valve chamber 14 in operative association with the throttling spool 30. The housing 12, which may, as shown, comprise an axially elongated cylinder capped at one end 11 by cover plug 16 and sealed at its other end 13, has three fluid ports opening through its wall, port 15 which is connected to a fluid supply means (not shown) via supply line 22 to receive fluid at supply pressure, port 17 which is connected in fluid communication via drain line 24 with a fluid reservoir maintained at a substantially constant drain pressure, and port 19 which is connected to a fluidic device (not shown) via line 26 through which fluid is discharged from the flow metering valve 10 to the fluidic device at a desired regulated pressure which lies between the relatively higher supply pressure and the relatively low drain pressure.

Disposed within the valve chamber 14 so as to extend along the inner wall 28 of the housing 12 are two axially elongated, generally cylindrical sleeves. Sleeve 50 is disposed within the portion of the valve chamber 14 proximate the sealed end 13 of the housing 12 and serves to retain the throttling spool 30 within the flow metering valve 10. Sleeve 60 is disposed within the portion of the valve chamber 14 proximate the capped end 11 of the housing 12 so as to abut at one end the cover plug 16 and at its other end the sleeve 50. The sleeve 60 thus extends as a spacing element between the cover plug 16 and the sleeve 50 so as to maintain the sleeve 50 at a fixed axial position within the valve chamber 14. The sleeve 50 has a plurality of first fluid flow passages 52 extending through its wall through which fluid passes from supply line 22 through the port 15 and annulus 25 into the throttling spool 30 and a plurality of second fluid flow passages 54 extending through its wall through which fluid passes from the throttling spool 30 through annulus 29 and port 19 into line 26 at regulated pressure.

The throttling spool 30 comprises an axially elongated cylindrical element having a central bore 31 extending axially therethrough, a first circumferentially extending annulus 32 formed in its outer surface, a plurality of radially extending fluid flow passages 33 connecting the first annulus 32 in flow communication with the central bore 31, a second circumferentially extending annulus 34 formed in its outer surface at a desired axial spacing from the first annulus 32, and a plurality of radially extending fluid flow passages 35 connecting the second annulus 34 in flow communication with the central bore 31. The throttling spool 30 is linked to the bias spring assembly 40 by means of a pin 20 which is adapted to be received into the central bore 31 of the throttling valve 30 at the end thereof proximate the bias spring assembly 40. The pin 20 serves both to guide the contraction or extension of the spring assembly 40 in axial alignment with the throttling spool 30 and transmit the bias force exerted by the spring assembly 40 upon the throttling spool 30.

The bias spring assembly 40 comprises a first spring seat 42 disposed proximate the throttling spool 30 and is adapted to receive the other end of the pin 20, a second spring seat 44 disposed proximate the cover plug 16 and having a stem 46 extending axially therefrom into and thru a central cavity 48 in the cover plug 16, and a compression spring 50 extending axially between and supported on the first spring seat 42 and the second spring seat 44. The compression spring 50 continuously exerts a bias force on the first spring seat 42, which bias force is transmitted therefrom via the pin 20 to be exerted against the throttling spool 30, and also upon the second spring seat 44, which force is transmitted through the stem 46 thereof to a positioning device (not shown) disposed externally of the flow metering valve 10 which is operable to selectively position the second spring seat 44 axially within the valve chamber 14. By axially translating the second spring seat 44 towards or away from the first spring seat 42, the degree of compression of the spring 50 may be changed thereby permitting selective variation of the magnitude of the bias force on exerted by the spring 50 upon the throttling spool 30.

In addition to being connected in fluid communication to the fluid inlet flow passages 52 and the fluid outlet flow passages 54 of the sleeve 50, the central bore 31 of the throttling spool 30 is connected in fluid communication with the pressure modulating valve 100 via conduit 70 whereby fluid is ported, at the same discharge regulated pressure at which the fluid passes from the central bore 31 of the throttling spool 30 to the fluidic device (not shown) for use therein, through a fixed orifice 37 into the valve subchamber 18 formed in the valve chamber 14 at end 13 of the flow metering valve 10, and therefrom through conduit 70 into the pressure modulating valve 100 to drain. As the fluid passes through the fixed orifice 37 into the subchamber 18, a pressure drop occurs which reduces the pressure of the fluid to the pressure maintained within the subchamber 18, which pressure is modulated by means of the pressure modulating valve 100 in response to any variation in the temperature of the fluid. The fluid within the subchamber 18 exerts a force proportional to this modulated pressure upon the end face 36 of the throttling spool 30 which acts counter to the spring bias force and the force exerted by the drain pressure fluid in the valve chamber 14 upon the end face 38 of the throttling spool 30.

The pressure modulating valve 100 constitutes means for modulating the pressure within the subchamber 18 by varying the flow area through which the fluid may pass from the subchamber 18 of the flow metering valve 10 to drain in response to a variation in fluid temperature. The pressure modulating valve 100 comprises a housing 102 having a fluid inlet 104 and a fluid outlet 106, a flapper nozzle assembly 110 supported within the housing 102 so as to discharge fluid through a variable flow discharge area 108 to drain pressure, and means 130 for adjusting the size of flow discharge area 108 of the flapper nozzle assembly 110 in response to the fluid temperature.

Referring now to in FIG. 2 in particular, the housing 102 may comprise an axially elongated, generally cylindrical tubular body defining a fluid chamber 125 therewithin and having a fluid inlet 104 proximate its aft end in fluid communication with the conduit 70 for receiving fluid passing from the subchamber 18 of the flow metering valve 10 and a fluid outlet 106 proximate its forward end in fluid communication with a drain conduit 124 for discharging fluid from the fluid chamber 125 to the drain reservoir (not shown). The flapper nozzle assembly 110 comprises a fluid nozzle 112 and a flapper 120 operatively associated therewith. The fluid nozzle 112 is supported along the axis of the 102 and has an inlet 114 proximate its aft end 111 in fluid communication with fluid inlet 104 for receiving fluid from the subchamber 18 of the flow metering valve 10, a discharge outlet 116 at the forward end thereof for discharging fluid therefrom, and an axially elongated flow passage 118 extending between the inlet 114 and the outlet 116 for conveying fluid therebetween. The flapper 120 comprises an axially translatable body having a flat face surface 122 disposed in opposed facing relationship to the outlet 116 of the fluid nozzle 112 at a selective distance therefrom. The flapper 120 is supported for axial translation in an end cap 140 secured to the forward end of the housing 102, for example by means a shaft member 126 which extends axially outward from the body of the flapper 120 into a central cavity 142 in the end cap 140 and is supported therein for translation along the axis of the housing 102 under the influence of the temperature responsive adjustment means 130 operatively associated therewith.

The flapper 120 also has a circumferential flange 128 which extends radially outwardly therefrom and has a first face 127 on the forward side thereof and a second face 129 on the rearward side thereof. The adjustment means 130 comprises at least one fluid temperature sensitive positioning member 132 operatively disposed within the fluid chamber 125 against the first face 127 of the flange 128 and a counter acting bias spring means 134 disposed against the second face 129 of the flange 128. The spring means 134 biases the flange 128 against the fluid temperature sensitive positioning member 132. As the temperature of the fluid passing through the fluid chamber 125 in contact with the fluid temperature sensitive positioning means 132 changes, the fluid temperature sensitive positioning means 132 contracts or expands in an axial direction responsively to the change in fluid temperature thereby adjusting, in coaction with the bias spring means 134, the axial position of the flapper 120 within the fluid chamber 125. As a result, the flat end face 122 of the flapper body 120 is repositioned relative to the outlet of the fluid nozzle 112, thus either increasing or decreasing the gap therebetween.

Advantageously, the temperature sensitive positioning means 132 comprises a plurality of annular washer-like cupped metallic discs, each of which expands or contracts in the axial direction in response to an increase or decrease, respectively, in fluid temperature, disposed coaxially about shaft member 126 extending outwardly from the body of the flapper 120 and arrayed therealong in abutting relationship between the first face 127 of the flange 128 and the face 144 of the end cap 140. As illustrated in FIG. 3, each of the metallic discs 132 may be a bimetallic disc comprising a first annular concave-convex member 131 made of a first metal and a second annular concave-convex member 133 made of a second metal bonded together concave face-to-convex face to form a cupped washer-like disc, the second metal having a different coefficient of thermal expansion than the first metal. So constructed, as a disc 132 experiences a change in temperature due to contact with the fluid passing through the fluid chamber 125, the two metallic members making up the disc expand at a differential rate, thus causing the disc to become more or less cupped thereby increasing or decreasing, respectively, the effective width of the disc. By arraying a plurality of cupped discs coaxially along the shaft member 126, advantageously with spacing washers 150 disposed between alternate pairs of discs 132 as illustrated, the bias force imposed upon flange 128 of the flapper 120, which force acts counter to the bias force imposed thereon by the spring means 134, will change with fluid temperature thereby moving the flapper 120 so as to reduce the discharge flow area 108 in response to an increase in fluid temperature and conversely, enlarge the discharge flow area 108 in response to a decrease in fluid temperature.

When the end face 122 of the flapper 120 moves axially relative to the stationary outlet 116 of the fluid nozzle 112, the discharge flow area 108 also changes, increasing in area as the end face 122 moves away from the outlet 116 of the fluid nozzle 112 and decreasing in area as the end face 122 moves toward the outlet 116 of the fluid nozzle 112. As a consequence of a change in the discharge flow area 108, there is a corresponding change in the rate of flow of fluid through the outlet 116 of the fluid nozzle 112, that is the flow of fluid from the subchamber 18 through the fixed orifice 37 of the flow metering valve 10 and thence through the fluid nozzle 112 of the pressure modulating valve 100 and the outlet 116 thereof into the fluid chamber 125 which is in fluid communication with drain, the fluid flow rate increasing as the discharge flow area increases and decreasing as the discharge flow area decreases. Attendant to such change in fluid flow rate passing from the subchamber 18 of the flow metering valve 10 is a change in the pressure drop occurring across the fixed orifice 37, the pressure drop thereacross increasing as the fluid flow rate thereacross increases and decreasing as the fluid flow rate thereacross decreases, which in turn results in a change in the pressure within the subchamber 18, that pressure decreasing as the pressure drop across the fixed orifice increases with increasing fluid flow and increasing as the pressure drop across the fixed orifice decreases with decreasing fluid flow. Thus, the pressure within the subchamber 18 of the flow metering valve 10, and therefore the force exerted by the fluid pressure therein upon the throttling valve 30, is modulated in response to fluid temperature and the axial position of the throttling valve 30 is also modulated in response to fluid temperature whereby the degree of openness of the window between the fluid opening 52 and annulus 34 is modulated to increase or decrease the supply of fluid therethrough into the throttling spool 30 to compensate for changing fluid viscosity with changing fluid temperature.

Accordingly, in the flow control apparatus of the present invention, the modulated pressure within the subchamber 18 of the flow metering valve 10 is constant at a particular level between regulated pressure and drain pressure at a given fluid temperature, but changes to a new pressure level between regulated pressure and drain pressure in response to fluid temperature as the pressure modulating valve 100 varies the flow of fluid from the flow metering valve 10 to drain in response to a change in fluid temperature. For instance, if the temperature of the fluid increases, the bimetallic discs 150 expand thus increasing the bias force acting upon the first face 127 of flapper flange 128 and overcoming the temperature unresponsive spring bias force exerted by spring means 134 on the second face 129 of the flapper flange 128. The net effect of this increase in bias force exerted upon the flapper 120 by the expanded discs 150 causes the end face 122 of the flapper 120 to move closer to the outlet 116 of the fluid nozzle 112, thereby reducing the discharge flow area 108 and consequently, reducing the flow of fluid from the subchamber 18 of the flow metering valve 10 through the fluid nozzle 112, decreasing the pressure drop across the fixed orifice 37 of the throttling spool 30, and increasing the modulated pressure within the subchamber 18. As the modulated pressure is increased, the force exerted upon the end face 36 of throttling spool 30 in counter action to the spring bias force and the force exerted by the drain pressure upon the end face 38 of the throttling spool 30, thus causing an imbalance of forces of the throttling valve 30 which causes the throttling spool 30 to shuttle within the flow metering valve 10 to decrease the window opening between the supply fluid inlet 52 in sleeve 50 and the annulus 34 of the the throttling valve 30. As a result, the pressure drop across this window would increase, causing a corresponding decrease in the magnitude of the regulated pressure and therefore a decrease in the fluid pressure within the subchamber 18 until a new force balance on the throttling valve 30 is achieved. In this manner, the regulated pressure at which the fluid is discharged from the throttling spool 30 of the flow metering valve 10 through conduit 26 to the fluidic device (not shown) associated therewith is decreased to compensate for the decrease in fluid viscosity as fluid temperature increases.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A flow control apparatus for receiving a fluid at a supply pressure and discharging a first portion of the received fluid at a regulated pressure less than the supply pressure, comprising:

means for receiving the supply fluid and for metering the first portion of discharge flow therefrom at the regulated pressure, said flow metering means including a flow throttling member operatively disposed therein, said flow throttling member being selectively positionable to adjust the magnitude of the regulated pressure in response to a modulated biasing pressure imposed upon said throttling member; and means for modulating the magnitude of the biasing pressure imposed upon said throttling member in response to a variation in the temperature of the fluid, said pressure modulating means comprising a flapper nozzle assembly having a fluid nozzle having an inlet in fluid communication with said biasing pressure and an outlet, a selectively displaceable flapper disposed in spaced relationship from and facing the outlet of said fluid nozzle so as to form a flow discharge area therebetween, and means responsive to fluid temperature for selectively positioning said displaceable flapper relative to the outlet of said fluid nozzle thereby varying the flow discharge area therebetween in response to a variation in fluid temperature, whereby the magnitude of said biasing pressure is modulated in response to a variation in fluid temperature.

2. An apparatus as recited in claim 1 wherein said flow metering means further includes a fixed flow area orifice which is transversed by a second portion of the supply fluid prior to passing to said pressure modulating means for discharge through said variable discharge flow area to drain pressure.

3. A flow control apparatus for receiving a fluid at a supply pressure and discharging a first portion of the supply fluid at a regulated pressure less than the supply pressure, comprising:

a. a flow metering valve for receiving the supply fluid and metering the first portion of the supply fluid therefrom at the regulated pressure, said flow metering valve comprising:

a housing defining an axially elongated valve chamber interiorly thereof and having inlet means for receiving the supply fluid and an outlet means for discharging the first portion of the supply fluid;

a throttling spool disposed in axially displaceable relationship within said valve chamber, said throttling spool having a first end face, a second end face, a first fluid inlet in variable registry with the inlet means to said housing, a first fluid outlet in registration with the outlet means of said housing, a second fluid outlet opening to a subchamber of said valve chamber adjacent to the second end face of said throttling spool, and a central fluid flow passage extending therethrough in fluid communication with the first fluid inlet, the first fluid outlet and the second fluid outlet; and a compression spring disposed within said valve chamber in operative association with said throttling spool so as to exert an axially directed spring bias force upon the first end face of said throttling spool acting counter a fluid pressure bias force acting on the second end face of said throttling spool; and b. a pressure modulating valve operatively associated with said flow metering valve, said pressure modulating valve comprising:

a housing having a fluid inlet in fluid communication with said subchamber of said flow metering valve for receiving a second portion of the supply fluid therefrom and a fluid outlet for discharging the second portion of the supply fluid therefrom to a relatively low drain pressure;

a flapper nozzle assembly disposed within the pressure modulating valve housing, said flapper nozzle assembly comprising a fluid nozzle having an inlet in registration with the housing fluid inlet for receiving the second portion of the supply fluid and an outlet for discharging the second portion of the supply fluid into a fluid chamber, said fluid chamber being in fluid communication through the housing fluid outlet to drain pressure, and a selectively displaceable flapper disposed within said fluid chamber in spaced relationship from and facing the outlet of said fluid nozzle so as to form a flow discharge area therebetween; and means responsive to fluid temperature for selectively positioning said displaceable flapper relative to the outlet of said fluid nozzle whereby the flow discharge area therebetween varies in response to a change in fluid temperature.

4. A flow control apparatus as recited in claim 3 wherein said flapper positioning means comprises first means responsive to fluid temperature for biasing said displaceable flapper in a direction towards the outlet of said fluid nozzle and second means substantially unresponsive to fluid temperature for biasing said displaceable flapper in a direction away from the outlet of said fluid nozzle, said first biasing means exerting a bias force upon said displaceable flapper which increases as fluid temperature increases and decreases as fluid temperature decreases.

5. A flow control apparatus as recited in claim 4 wherein said first bias means comprises at least one temperature responsive, bimetallic cupped washer-like disc operatively disposed relative to said displaceable flapper to exert a bias force thereon, said at least one disc adapted to expand in response to increasing fluid temperature whereby the bias force correspondingly increases and to contract in response to decreasing fluid temperature whereby the bias force correspondingly decreases.

6. A flow control apparatus as recited in claim 5 wherein said second bias means comprises a compression spring operatively disposed relative to said displaceable flapper to exert a bias force thereon biasing said displaceable flapper away from the outlet of said fluid nozzle.

* * * * *